(12) United States Patent
Balasubramanian et al.

(10) Patent No.: US 9,176,997 B2
(45) Date of Patent: Nov. 3, 2015

(54) UNIVERSE MIGRATION FROM ONE DATABASE TO ANOTHER

(71) Applicants: Makesh Balasubramanian, Bangalore (IN); Venkatram Vundavalli, Bangalore (IN)

(72) Inventors: Makesh Balasubramanian, Bangalore (IN); Venkatram Vundavalli, Bangalore (IN)

(73) Assignee: SAP SE, Walldorf (DE)

( * ) Notice: Subject to any disclaimer, the term of this patent is extended or adjusted under 35 U.S.C. 154(b) by 200 days.

(21) Appl. No.: 13/929,796

(22) Filed: Jun. 28, 2013

(65) Prior Publication Data

US 2015/0006490 A1 Jan. 1, 2015

(51) Int. Cl.
*G06F 17/30* (2006.01)

(52) U.S. Cl.
CPC ........ *G06F 17/303* (2013.01); *G06F 17/30371* (2013.01)

(58) Field of Classification Search
CPC .......................... G06F 17/303; G06F 17/30371
See application file for complete search history.

(56) References Cited

U.S. PATENT DOCUMENTS

| | | | |
|---|---|---|---|
| 6,996,589 B1 * | 2/2006 | Jayaram et al. | 1/1 |
| 7,664,795 B2 * | 2/2010 | Balin et al. | 707/661 |
| 7,899,810 B2 * | 3/2011 | Cambot et al. | 707/713 |
| 7,996,245 B2 * | 8/2011 | Gejdos et al. | 705/3 |
| 2009/0077114 A1 * | 3/2009 | Zachariah | G06F 17/303 1/1 |
| 2012/0265726 A1 * | 10/2012 | Padmanabhan et al. | G06F 17/303 707/602 |

OTHER PUBLICATIONS

Amazon Web Services, Database Developer Guide, API Version Dec. 1, 2012; FROM Clause.*

* cited by examiner

*Primary Examiner* — Alicia Willoughby (57) ABSTRACT

A semantic layer (universe), which is created on a source database (DB), is migrated to a target DB. The migration includes pre-migration steps, actual migration and post-migration steps. The pre-migration steps prepare the target DB for the actual migration by configuring the target DB and determining the differences between the source DB and the target DB. During the actual migration, data, tables and views are migrated to the target DB conforming to the target database structure, functions and configuration. A new universe is created on the target database and all consumers of the source universe such as created reports are changed to refer to the new universe.

15 Claims, 6 Drawing Sheets

UNIVERSE MIGRATION FROM ONE DATABASE TO ANOTHER

BACKGROUND

Customers use databases from external providers to store data. There are many reasons to move from one database (DB) to another DB—better performance, change in data received from external providers, corporate policy to move to a new DB, etc.

Customers need to make a lot of changes to make an application compatible with a new DB. They have to migrate all their Business Objects content namely: universes, reports and other dependent components. It is a huge task to make all of these compatible with a new DB. A lot of time is expected to be needed for creating and tuning Universes.

Potential problems with a new DB may be that each DB has its own way of supporting Structured Query Language (SQL); tables and views are case sensitive; a qualifier added to identify the table and view varies in each DB; DB specific parameters need to be re-mapped to a new DB, etc. Another problem may be if not all tables are present in a DB. Some objects in a universe may have reference in queries and may not be part of the schema.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for universe migration from a source database (DB) to a target DB are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
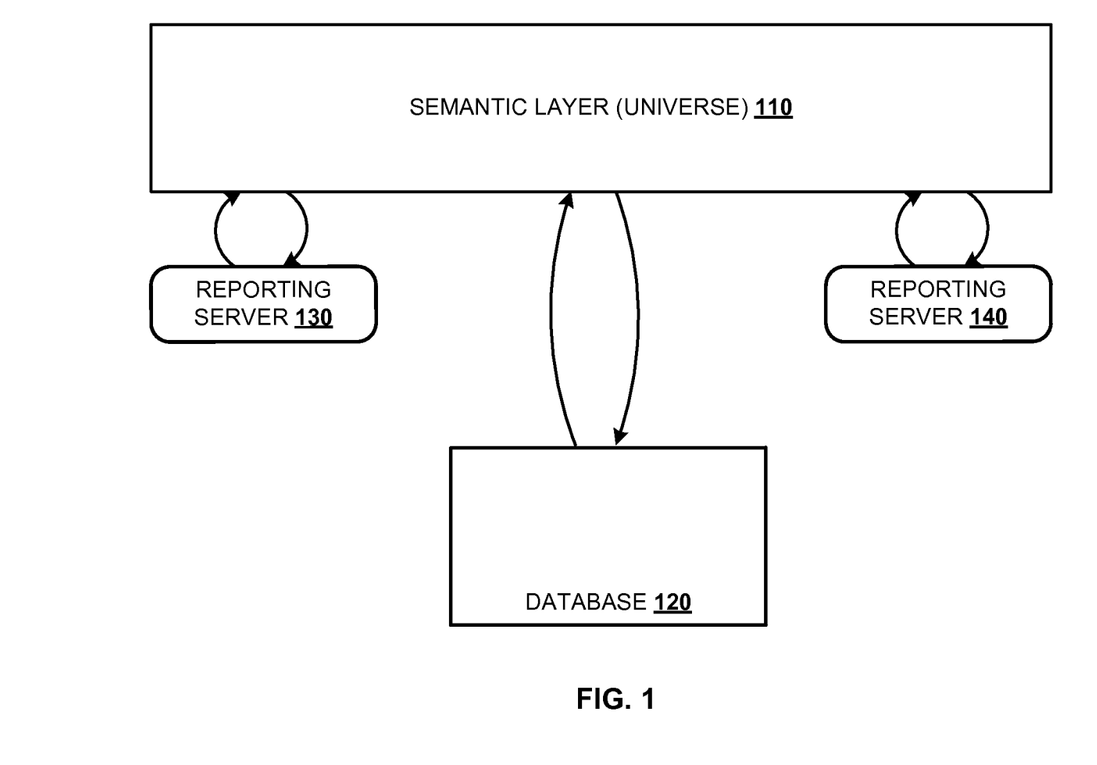
FIG. 1 is a block diagram illustrating a semantic layer (universe) and its connections to a database and reporting servers.

There are many Business Intelligence (BI) products that provide insight into customer data. There are also many report based solutions that allow customers to analyze and create ad-hoc reporting on the data. Universe is a semantic layer that hides database details and gives business perspective. It allows end users easy way to understand customer data. It hides all the database internals and also it contains various parameters that would help users to tune queries and improve the performance. FIG. 1 represents a semantic layer (universe) 110 and its connections to a database 120 and reporting servers 130, 140. Customers create universes on a database in a generic way that can cater the needs of hundreds of reports. Many reporting solutions use universes as input for creating ad-hoc report for analysis. Universe designers spend a lot of time in designing universes as being input for ad-hoc reporting and analysis. A universe contains components that can be divided in to two categories: visual components and data foundation. Visual components are used for reporting and are also called objects. They are dimensions, details, measures and filters. The end-users choose combination of objects to create reports. Data foundation includes database schema and various parameters. A database schema is a graphical representation of DB structures. The database schema contains physical tables, views and virtual tables (based on, for example, Structure Query Language (SQL) queries that provide a result). The database schema also contains relations between the tables (primary key, foreign key etc.) and joins (left outer, left inner, right outer, right inner). The joins link tables so that correct data is returned for queries. All the information is used to generate queries during the report creation. The various parameters are used for report creation, customization and performance tuning.

Figure 2:
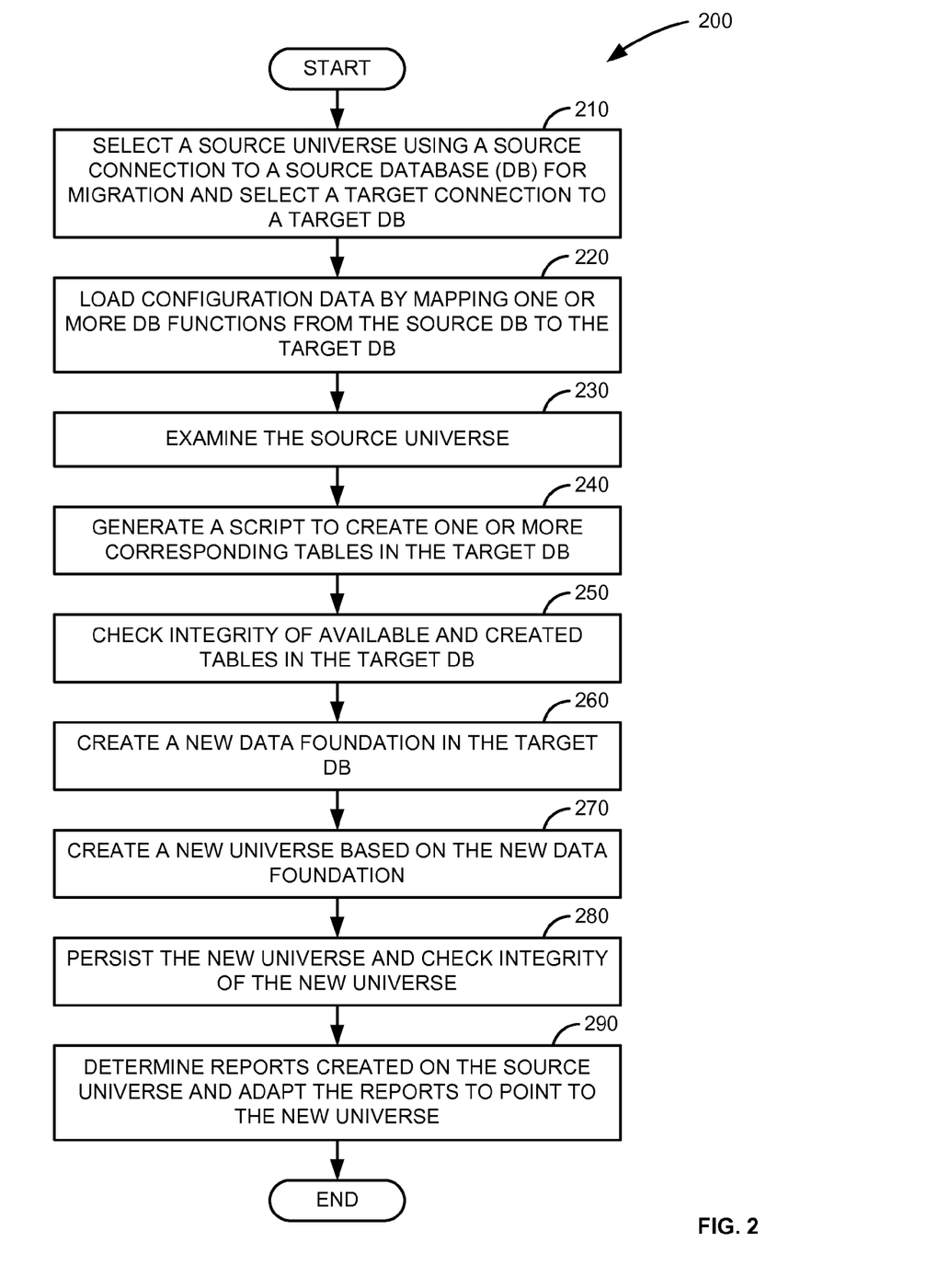
FIG. 2 is a flow diagram illustrating an embodiment of a method for universe migration from a source database (DB) to a target DB.

FIG. 2 is a flow diagram illustrating an embodiment of a method 200 for universe migration from a source database (DB) to a target DB. At block 210, a source universe using a source connection to a source DB is selected for migration. The source universe is a currently used semantic layer that uses the source DB for data persistency. The source universe may be, for example, semantic layer 110, and the source DB may be such as DB 120. A target connection to a target DB is also selected. The target DB is a new DB that is going to be used instead of the source DB. Switching from the source DB to the target DB requires data transfer, configuration, and tuning.

At block 220, configuration data is loaded by flapping DB functions front the source DB to the target DB. The mapping is performed using the source connection and the target connection. DB functions may be used in SQL queries, part of the universe objects. When these objects are used in reports, the SQL queries will be generated based on objects syntax. DB functions may vary from one database to another. Configuration data provides mapping of DB functions from a source DB to a target DB.

At block 230, the source universe is examined. In one embodiment, examining the source universe includes the steps as described further in connection to FIG. 3.

At block 240, a script is generated to create corresponding tables in the target DB that are unavailable in the target DB, compared to the source DB. A list of tables not present in the target DB is created after the source universe examination and comparison to the target DB.

At block 250, the integrity of all tables in the target DB is checked. These tables include available tables in the target DB and tables created at block 240. The integrity means the data contained is accurate and reliable.

At block 260, a new data foundation is created in the target DB. In one embodiment, creating the new data foundation includes the steps as described further in connection to FIG. 4.

At block 270, a new universe is created based on the new data foundation.

At block 280, the new universe is persisted and the integrity of the new universe is checked.

At block 290, reports created on the source universe are determined and the reports are adapted to point to the new universe. In one embodiment determining the reports includes determining of consumers of the source universe, preparing a list of reports created on the source universe, and changing references of the reports created on the source universe to point to the new universe.

Figure 3:
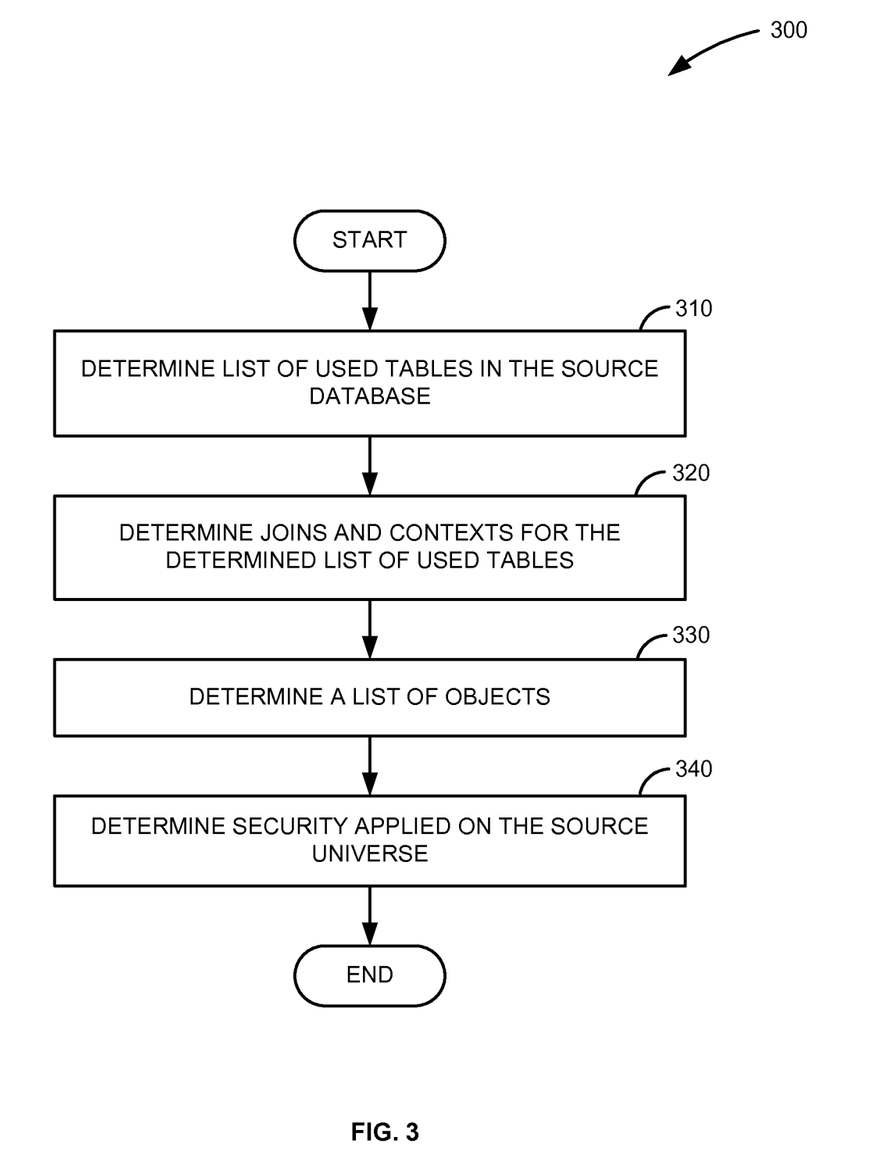
FIG. 3 is a flow diagram illustrating an embodiment of a method for examining a source universe.

FIG. 3 is a flow diagram illustrating an embodiment of a method 300 for examining a source universe. At Block 310, a list of used tables in the source DB is determined. In one embodiment, the list of used tables includes tables, views, alias tables, and derived tables. The tables are physical tables present in the source DB. Views can be views created in the source DB. Alias tables are copies of the tables present in the database schema. Derived tables may be results in form of tables based on queries.

Further, at block 320, joins and contexts are determined for the list of used tables in the source DB. Context is a set of joins in a universe, which provides a valid join path between tables for generating queries. First, a list of joins is prepared (type, syntax, etc.), and then for each context—the used joins.

At block 330, a list of objects is determined. In one embodiment, determining the list of objects includes identifying used DB functions. In one embodiment, the list of objects includes dimensions, details, measures, and filters.

At block 340, security applied on the source universe is determined. The security may be applied on tables and objects. In one embodiment, determining the security applied on the source universe includes examining security rules and determining queries containing DB functions.

Figure 4:
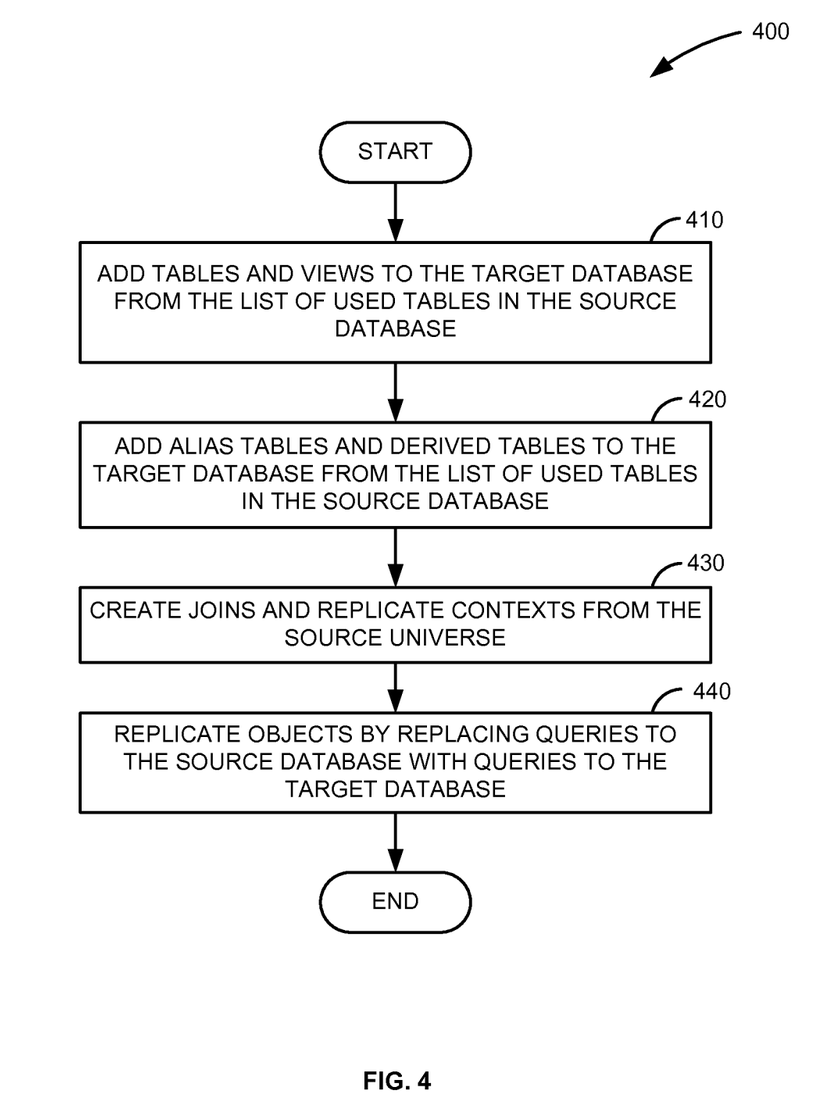
FIG. 4 is a flow diagram illustrating an embodiment of a method for creating a new data foundation in a target DB.

FIG. 4 is a flow diagram illustrating an embodiment of a method 400 for creating a new data foundation in a target DB. At block 410, tables and views are added to the target DB from the list of used tables in the source DB.

At block 420, alias tables and derived tables are added to the target DB from the list of used tables in the source DB based on dependency logic. For a derived table, the source table functions have to be replaced with matched functions according to step 220 in FIG. 2. A new query is then used to create the derived table in the target DB.

At block 430, joins are created and contexts from the source universe are replicated.

At block 440, objects are replicated by replacing queries to the source DB with queries to the target DB.

Figure 5:
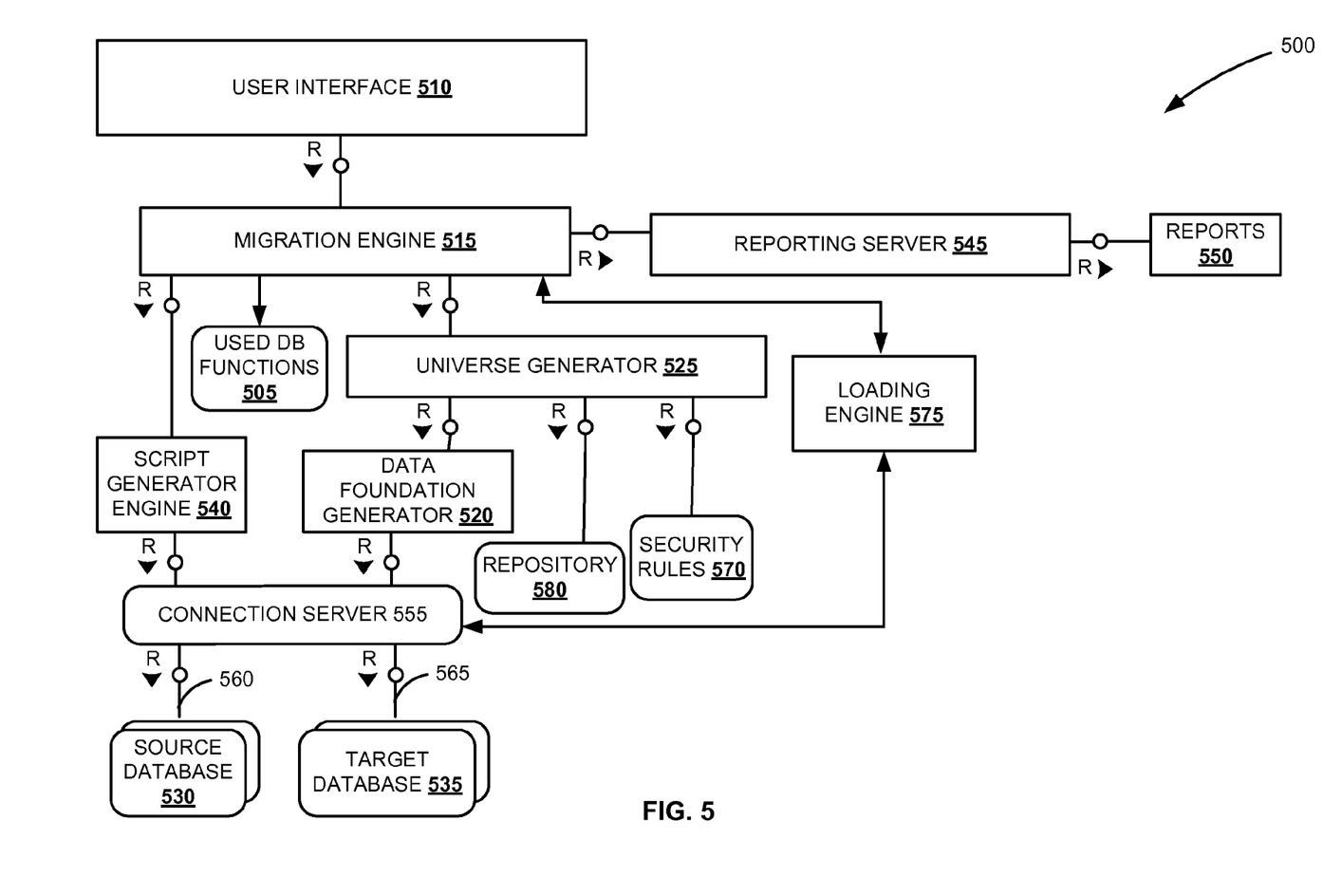
FIG. 5 is a block diagram illustrating an embodiment of a system for universe migration from a source database (DB) to a target DB.

FIG. 5 is a block diagram illustrating an embodiment of a system 500 for universe migration from a source database (DB) to a target DB. The system 500 includes a source universe using a source DB 530 through a source connection 560. The system 500 also includes a new universe using a target DB 535 through a target connection 565. The source universe and the new universe are accessible to users through the user interface 510. A loading engine 575 is operable, based on the source connection 560 and the target connection 565 to load configuration data comprising mapping of one or more DB functions of the source DB 530 and the target DB 535. In one embodiment, a connection server 555 mediates the connections to the source database 530 and the target database 535.

A script generator engine 540 is operable to generate a script to create one or more corresponding tables in the target DB, wherein the created one or more corresponding tables are from a list of used tables in the source DB 530 unavailable in the target DB 535.

A data foundation generator 520 is operable to create a new data foundation in the target DB 535.

A universe generator 525 is used to create the new a universe based on the new data foundation.

A migration engine 515 performs the migration from the source universe to the new universe. The migration engine 515 is operable to examine the source universe. In one embodiment, the migration engine 515 is also operable to determine the list of used tables in the source DB 530, determine joins and contexts for the determined list of used tables, determine a list of objects, and determine security applied on the source universe 530. In one embodiment the of used tables includes tables, views, alias tables and derived tables. In one embodiment, the migration engine 515 is operable to identify used DB functions 505. In one embodiment, the objects may be dimensions, details, measures, and filters. In one embodiment, the migration engine 515 is operable to examine security rules 570 and determine queries containing DB functions. The migration engine 515 is also operable to check integrity of available and created tables in the target DB 535. The migration engine 515 is further operable to persist the new universe and check the integrity of the new universe. In one embodiment, the new universe is persisted in repository 580. The migration engine 515 is also operable to determine reports 550 created on the source universe and adapt the reports 550 to point to the new universe, in one embodiment, the reports 550 are accessed through a reporting server 545.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is located remotely from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise catty a set of instructions for execution by a computer system which causes the computer system to perform any of the methods or process steps described, represented, or illustrated herein. A computer readable storage medium may be a non-transitory computer readable storage medium. Examples of non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java C++, or other object-oriented programming language and development tools. Another embodiment may be implemented in hard-wired circuitry in place of, or in combination with machine readable software instructions.

Figure 6:
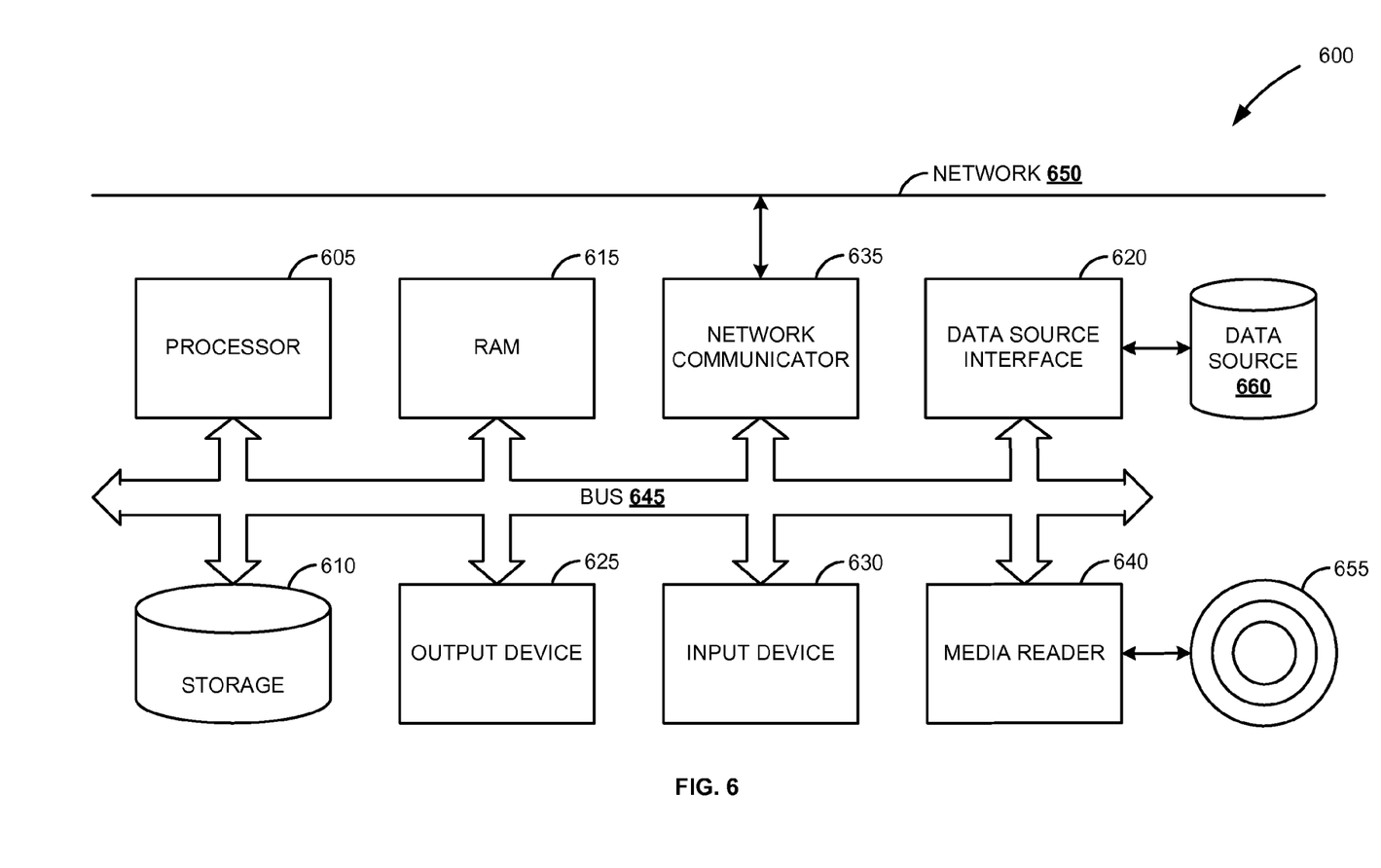
FIG. 6 is a block diagram illustrating an embodiment of a computing environment in which the techniques described for universe migration from a source database (DB) to a target DB can be implemented.

FIG. 6 is a block diagram of an exemplary computer system 600. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for universe migration from a source database (DB) to a target DB, comprising:
    selecting a source universe for migration, the source universe using the source DB through a source connection and selecting a target connection to the target DB;
    based on the source connection and the target connection, loading configuration data comprising mapping of one or more DB functions of the source DB and the target DB;
    examining the source universe, by:
        determining the list of used tables in the source DB;
        determining joins and contexts for the determined list of used tables;
        determining a list of objects; and
        determining security applied on the source universe;
    generating a script to create one or more corresponding tables in the target DB, wherein the created one or more corresponding tables are from a list of used tables in the source DB unavailable in the target DB compared to the source DB;
    checking integrity of available and created tables in the target DB;
    creating a new data foundation in the target DB, by:
        adding tables and views to the target DB from the list of used tables in the source DB;
        adding alias tables and derived tables to the target DB from the list of used tables in the source DB based on dependency logic;

creating joins and replicating contexts from the source universe; and replicating objects by replacing queries to the source DB with queries to the target DB;

creating a new universe based on the new data foundation;

persisting the new universe and checking integrity of the new universe; and determining reports created on the source universe and adapting the reports to point to the new universe.

2. The method of claim 1, wherein the list of used tables comprises tables, views, alias tables and derived tables.

3. The method of claim 1, wherein determining the list of objects further comprises identifying used DB functions.

4. The method of claim 1, wherein the objects are one or more selected from the group consisting of dimensions, details, measures, and filters.

5. The method of claim 1, determining the security applied on the source universe further comprises:

examining one or more security rules; and determining one or more queries containing DB functions.

6. A computer system for universe migration from a source database (DB) to a target DB, comprising:

a processor; and a memory in communication with the processor, the memory storing instructions related to:

a source universe using the source DB through a source connection;

a new universe using the target DB through a target connection;

a loading engine that loads, based on the source connection and the target connection, configuration data comprising mapping of one or more DB functions of the source DB and the target DB;

a script generator engine that generates a script to create one or more corresponding tables in the target DB, wherein the created one or more corresponding tables are from a list of used tables in the source DB unavailable in the target DB;

a data foundation generator that creates a new data foundation in the target DB by:

adding tables and views to the target DB from the list of used tables in the source DB;

adding alias tables and derived tables to the target DB from the list of used tables in the source DB based on dependency logic;

creating joins and replicating contexts from the source universe; and replicating objects by replacing queries to the source DB with queries to the target DB;

a universe generator that creates the new universe based on the new data foundation; and a migration engine that:

examines the source universe by:

determining the list of used objects in the source DB;

determining joins and contexts for the determined list of used tables;

determining a list of objects; and determining security applied on the source universe;

checks integrity of available and created tables in the target DB;

persists the new universe and check integrity of the new universe; and determines reports created on the source universe and adapt the reports to point to the new universe.

7. The system of claim 6, wherein the list of used tables comprises tables, views, alias tables and derived tables.

8. The system of claim 6, wherein the migration engine is further operable to identify used DB functions.

9. The system of claim 6, wherein the objects are one or more selected from the group consisting of dimensions, details, measures, and filters.

10. The system of claim 6, wherein the migration engine is further operable to:

examine one or more security rules; and determine one or more queries containing DB functions.

11. An article of manufacture including a non-transitory computer readable storage medium to tangibly store instructions, which when executed by a computer, cause the computer to:

select a source universe for migration, the source universe using a source DB through a source connection and to select a target connection to a target DB;

based on the source connection and the target connection, load configuration data through mapping of one or more DB functions of the source DB and the target DB;

examine the source universe by:

determining the list of used tables in the source DB;

determining joins and contexts for the determined list of used tables;

determining a list of objects; and determining security applied on the source universe;

generate a script to create one or more corresponding tables in the target DB, wherein the created one or more corresponding tables are from a list of used tables in the source DB unavailable in the target DB compared to the source DB;

check integrity of available and created tables in the target DB;

create a new data foundation in the target DB by:

adding tables and views to the target DB from the list of used tables in the source DB;

adding alias tables and derived tables to the target DB from the list of used tables in the source DB based on dependency logic;

creating joins and replicating contexts from the source universe; and replicating objects by replacing queries to the source DB with queries to the target DB;

create a new universe based on the new data foundation;

persist the new universe and check integrity of the new universe; and determine reports created on the source universe and adapt the reports to point to the new universe.

12. The article of manufacture of claim 11, wherein the list of used tables comprises tables, views, alias tables and derived tables.

13. The article of manufacture of claim 11, wherein the instructions to determine the list of objects further comprise instructions, which when executed by a computer, cause the computer to identify used DB functions.

14. The article of manufacture of claim 11, wherein the objects are one or more selected from the group consisting of dimensions, details, measures, and filters.

15. The article of manufacture of claim 11, wherein the instructions to determine the security applied on the source universe further comprise instructions, which when executed by a computer, cause the computer to:

examine one or more security rules; and determine one or more queries containing DB functions.

* * * * *